Nov. 25, 1952 L. H. MEDLOCK 2,618,868
EDUCATIONAL DEVICE
Filed May 18, 1950
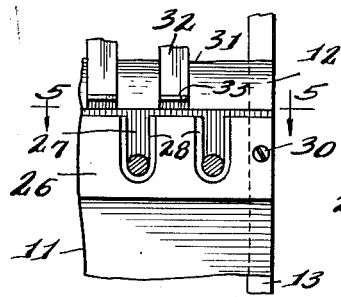
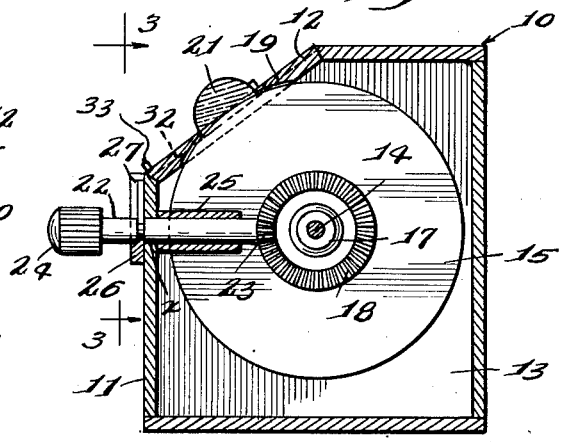
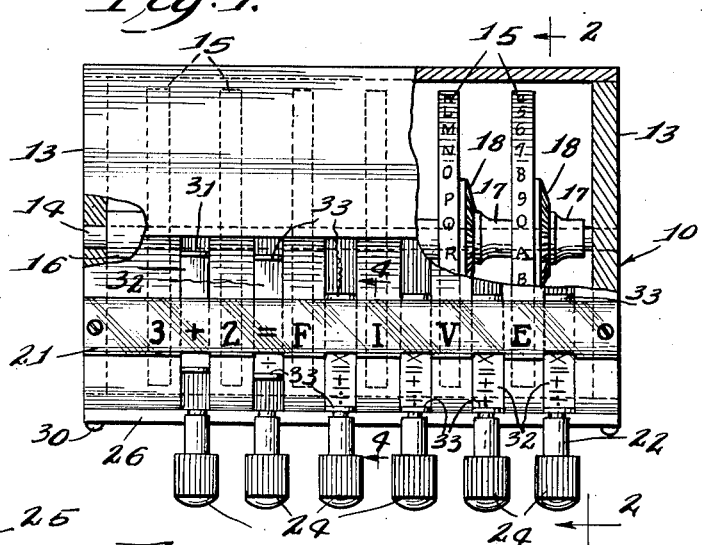
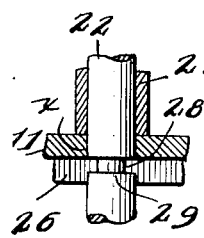
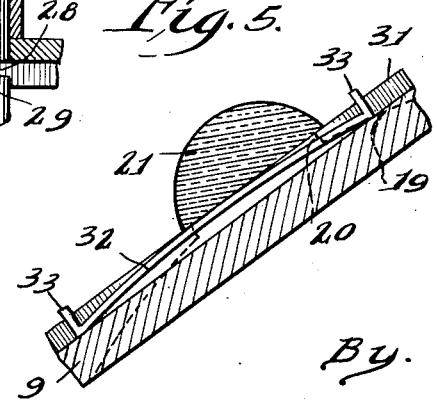
Inventor.
Laurance H. Medlock.
By E. K. Tundy
Attorney.

Patented Nov. 25, 1952

2,618,868

UNITED STATES PATENT OFFICE 2,618,868

EDUCATIONAL DEVICE

Laurance H. Medlock, Great Lakes, Ill.

Application May 18, 1950, Serial No. 162,739

3 Claims. (Cl. 35—31)

The present invention relates to educational devices and more particularly to an arrangement for teaching spelling and problems in arithmetic.

It is one of the principal objects of this invention to simplify the construction of an educational device such as contemplated herein, and to improve the efficiency and operation of such device.

It is another object hereof to provide in a single housing, a novel mechanism whereby words may be spelled and simple problems in arithmetic may be solved. The arrangement of the apparatus is such that both spelling and arithmetic may be taught simultaneously or at separate times. An example of simultaneous teaching of the two subjects is graphically presented in the drawing which shows the problem of adding three and two with the result spelled by the letters "FIVE."

Also, it is an object of this invention to provide an educational device which is simple to operate and is sturdily constructed in a manner so that it will not readily get out of order. The operating mechanism has a minimum of parts, many of which are duplicates, thereby permitting the device to be rapidly produced with the result that it may be sold for a reasonable price.

Additional objects, aims and advantages of the invention contemplated herein will be apparent to persons skilled in the art after the construction and operation of the educational device is understood from the within description.

It is preferred to accomplish the numerous objects of this invention and to practice the same in substantially the manner hereinafter fully described and as more particularly pointed out in the appended claims, reference being made to the accompanying drawings that form a part of this specification.

In the drawings:

Fig. 1 is a top plan, partly broken away, showing a preferred form of the educational device contemplated herein;

Fig. 2 is a vertical section taken on the plane of line 2—2 on Fig. 1;

Fig. 3 is a fragmentary detail;

Fig. 4 is an enlarged sectional view taken on the plane of line 4—4 on Fig. 1; and Fig. 5 is an enlarged detail showing the manner of mounting and retaining an actuator spindle.

The drawings are to be understood as being more or less of a schematic character for the purpose of disclosing a typical or preferred form of the invention contemplated herein, and in these drawings like reference characters identify the same parts in the different views.

The educational device herein disclosed comprises generally a housing wherein a plurality of character bearing discs are rotatably mounted for movement to different positions for displaying the characters in windows in the housing, and between the planes of these discs are a plurality of sliding pieces bearing arithmetic symbols which are adapted to be selectively shifted to display the symbols in conjunction with the numerals which comprise a group of the characters borne by the discs. The discs and the slides may be operated manually by either the instructor or the pupil as desired. It should be here noted that the device is of small dimensions so that it may be readily handled by a child or may be carried in the pocket of a garment. Also the characters and symbols borne respectively by the discs and slides are read through magnifying means extending across the housing windows and slides in order to avoid eye-strain. The details of construction and the arrangement of the mechanism in a preferred embodiment of the device will now be described.

The generally rectangular housing 10 has opaque walls, preferably of plastic, including an upright front wall 11 with a slanting upper portion 12, and there are upright end walls 13 in which the terminals of a horizontal shaft 14 are secured. A plurality of separate discs 15 are rotatably mounted on shaft 14 and have letters and numerals on their peripheries as best seen in Fig. 1. The first disc at the left, Fig. 1, is spaced from the end wall by a collar 16 and the elongate hub 17 of each disc spaces such disc from the next succeeding disc in successive order. The portions of these hubs adjacent their respective discs are formed with beveled gears 18. At their peripheral portions the discs 15 are movable in arcuate slots 19 made in the underside of the slanting wall 12, and said slots cut through the outer surface of the wall 12 to provide a row of windows 20 as shown in Fig. 4. These windows are covered by a lens bar 21 for effecting enlargement of the letters and numerals borne by the peripheries of the discs for readily reading these characters and avoiding eye-strain.

Means are provided for selectively rotating each disc independently of the other discs, such means preferably comprising manually rotatable horizontal spindles 22 extending through vertical front wall 11 and have pinions 23 at their inner ends which are intermeshed with the gears 18 at the hubs of the respective discs 15. At their outer ends these spindles have knurled heads 24 to be grasped by the operator's fingers for selectively rotating each disc to a position where the proper letters or numerals are displayed in the windows beneath the lens bar 21.

The housing front wall 11 has a plurality of apertures x through which the spindles 22 extend and these apertures are surrounded by sleeves 25 extending inward towards shaft 14 to provide journals for the respective spindles. The spindles are maintained against removal or longitudinal movement out of the openings and journal sleeves by novel means which comprise an elongate retainer 26 which has a plurality of recesses 27 extending inward from one of its longitudinal margins, said recesses being shouldered as at 28 at their inner regions to fit within annular grooves 29 formed in adjacent portions of the spindles. This arrangement also facilitates the assembly of the spindles by reason of the fact said spindles may be inserted far enough into their apertures and journals to interengage the gears, and thereafter the retainer strip 26 is placed against the front surface of the wall and then moved upwardly to seat the shoulders 28 of the recesses in the respective grooves 29 of the spindles. The retainer strip 26 may then be secured to the housing wall in any suitable manner as by screws 30.

It is to be here noted that the spindles each lie in a plane alongside of and between the respective discs 15 to provide a compact assembly. The discs are adapted to be separately rotated to selectively position the rim borne characters in the windows 20 beneath the lens bar 21 for spelling words and also for solving arithmetic problems in conjunction with a cooperating portion of the device which will now be explained.

The slanting wall 12 has therein a plurality of guide channels 31 which are located in planes between the planes of the discs 15. These guide channels receive the symbol bearing strips 32 forming that portion of the device for teaching simple arithmetic problems in cooperation with the spelling portion of the device. These guide channels 31 extend beneath the lens bar 21 and the symbol bearing strips 32 are permanently bowed between their ends so as to provide frictional contact against the lens bar and the bottoms of the guide channels 31. Both ends of the strips 32 have lateral flanges or lips 33 which are of sufficient height to be grasped by the fingers for moving the individual strips to selected positions with respect to the lens bar to display a symbol through such lens. These flanges or lips 33 also are effective to prevent the dislodgement or withdrawal of the strips from their guide channels.

It is apparent from the foregoing that both spelling and arithmetic may be taught at the same time with the educational device contemplated herein. As shown in Fig. 1 a simple problem of addition is presented and the problem has been solved by spelling the sum of the two figures which are seen in the lens bar. When the mathematical problems or exercises are not being presented the strips 32 are moved to positions where the symbols thereon are not visible through the lens bar 21, so that the device may then be used for spelling words having not more than the number of character bearing discs and their actuator spindles.

While this invention has been shown and described in its present preferred form or embodiment, it will be apparent to persons skilled in the art, after understanding the improvements, that various changes and modifications may be made therein without departing from the spirit or scope thereof. It is aimed in the appended claims to cover all such changes and modifications.

What is claimed is:

1. An educational device comprising a housing having a window in a wall thereof and an aperture below said window; a disc rotatably mounted in said housing with indicia on its periphery for selective display in said window; a lens bar arranged across said window through which selected indicia on said disc are viewed; meshed gear and pinion means for rotating said disc; a rotatable spindle for driving said pinion and having an annular groove remote thereto, said spindle extending through said aperture; a bearing sleeve secured to said housing wall in surrounding relation to said aperture for journaling said spindle; a retainer strip secured to said housing wall with a recess extending inward from one of its edges and having a shouldered region therein seated in said spindle groove for maintaining said spindle against longitudinal removal through said aperture; an elongated bowed symbol carrier member slidable on said housing wall beneath said lens bar in directions transverse thereto and being frictionally engaged with said lens bar and said housing wall for releasably holding it in selected positions with a symbol beneath said lens bar; and upturned lips on said carrier member for permitting manual sliding movement of said member to display a selected symbol and also for limiting said movement.

2. An educational device comprising a housing having windows in a wall thereof and apertures below said windows; an elongate shaft mounted in said housing; a plurality of discs rotably mounted on said shaft with indicia on their peripheries for selective display in the respective windows; a lens bar arranged across the windows through which selected indicia on said discs are viewed; meshed gear and pinion means for independently rotating each disc; rotable spindles for driving said pinions and each having an annular groove remote to its pinion, said spindles extending through said apertures; bearing sleeves secured to said housing wall in surrounding relation to said apertures for journaling said spindles; a retainer strip secured to said housing wall with a plurality of recesses extending inward from one of its edges, each recess having a shouldered region seated in the groove of the adjacent spindle for maintaining the respective spindle against longitudinal removal through its aperture; elongated bowed symbol carrier members each independently slidable on said housing wall beneath said lens bar in directions transverse thereto and being frictionally engaged with said lens bar and said housing wall for releasably holding each carrier member in any selected positions with a symbol beneath said lens bar; and upturned lips at the ends of said carrier members for permitting manual sliding movement of said members to display selected symbols thereon and also for limiting said movement.

3. An educational device comprising a housing having windows in a wall thereof and apertures below said windows; an elongate shaft mounted in said housing; a plurality of discs rotably mounted on said shaft with indicia on their peripheries for selective display in the respective windows; a lens bar arranged across the windows through which selected indicia on said discs are viewed; meshed gear and pinion means for independently rotating each disc; rotable spindles extending through said wall apertures and drivingly connected to said pinions; bearing sleeves secured to said housing wall in surrounding relation to said apertures for journaling said spindles; means for maintaining said spindles against longitudinal removal through said apertures; elongated symbol carrier members each independently slidable on said housing wall beneath said lens bar in directions transverse thereto and being frictionally engaged with said lens bar and said housing wall for releasably holding each carrier member in any selected position with a symbol beneath said lens bar; and means at the ends of said carrier members for permitting manual sliding movement of said members to display selected symbol through said lens bar and defining the limits of said movement.

LAURANCE H. MEDLOCK.

REFERENCES CITED

The following references are of record in the file of this patent:

UNITED STATES PATENTS

| Number | Name | Date |
|---|---|---|
| 1,246,860 | Brachtl et al. | Nov. 20, 1917 |
| 1,833,793 | Pfleger | Nov. 24, 1931 |
| 1,920,844 | Curry | Aug. 1, 1933 |
| 2,152,777 | Swindell | Apr. 4, 1939 |
| 2,476,580 | Bergman | July 19, 1949 |
| 2,541,161 | Harper | Feb. 13, 1951 |